United States Patent Office 2,755,310
Patented July 17, 1956

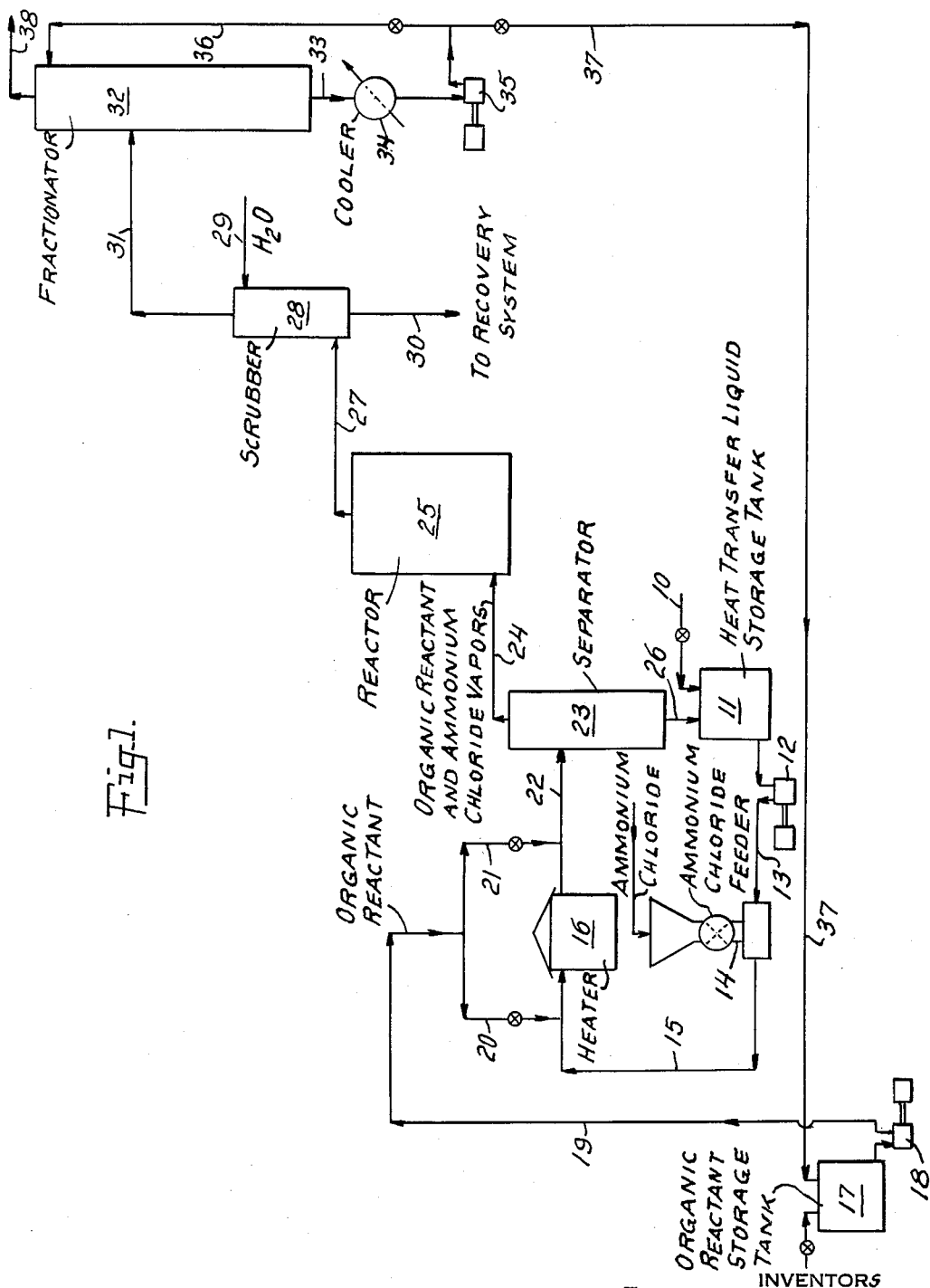

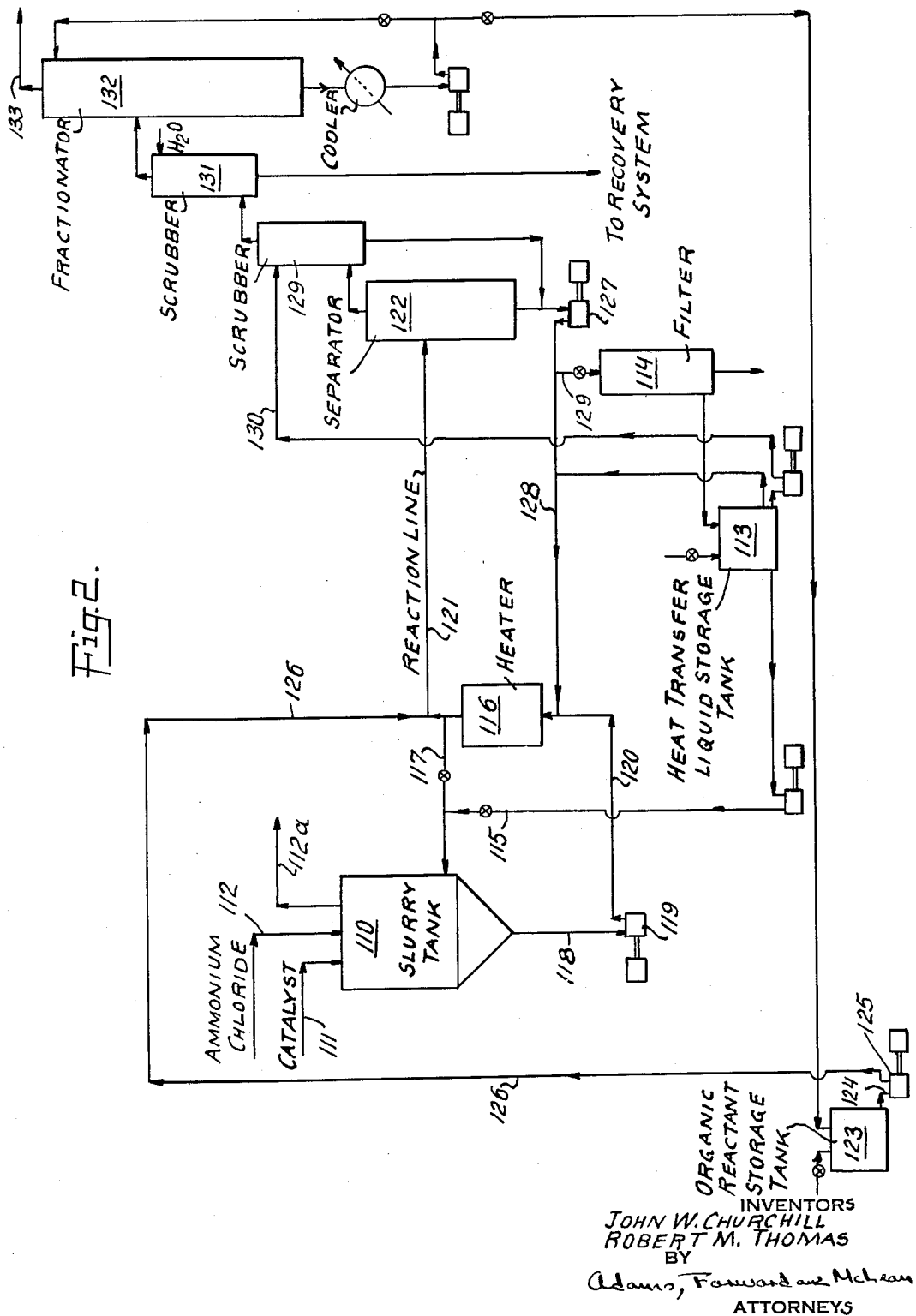

2,755,310

PRODUCTION OF ORGANIC CHLORIDES BY REACTION OF ORGANIC COMPOUND WITH AMMONIUM CHLORIDE

John W. Churchill, Kenmore, and Robert M. Thomas, Niagara Falls, N. Y., assignors to Olin Mathieson Chemical Corporation, a corporation of Virginia Application November 28, 1951, Serial No. 258,634

13 Claims. (Cl. 260—652)

Our invention relates to the manufacture of organic chlorides from ammonium chloride and acetylene or organic oxygen, sulfur and nitrogen bearing compounds. In particular, our invention relates to a method of handling and contacting ammonium chloride with reactive organic compounds, in the presence of a catalyst, at elevated temperatures and in the vapor state.

In our co-pending applications, Serial No. 243,345, filed August 23, 1951, and Serial No. 243,346, filed August 23, 1951, we disclosed that organic compounds containing a reactive oxygen, sulfur or nitrogen group such as an alcohol, ether, aldehyde, ester or a sulfur or nitrogen analogue thereof react with ammonium halides (but not with ammonium iodide) at about 250° to 500° C. in the presence of a dehydrochlorination type catalyst of acidic to mildly alkaline character to form corresponding organic halides. The reaction with alcohols, particularly methanol and ethanol, to produce methyl and ethyl chlorides respectively is preferred. Alumina is the most effective catalyst but various activated earths and silicates, and metal halides are also effective. Temperatures of 250° to 500° C. are employed and contact time is inversely correlated with temperature. A short contact time is desired at high temperature and is obtained by control of the space velocity of the reactants. Following the reaction, the vapors pass through a recovery system usually comprising scrubbing, cooling, condensing and distillation to fractionate the reaction mixture and recover the organic halide and ammonia.

Pending application, Serial No. 243,344, filed August 23, 1951, of John W. Churchill discloses that acetylene reacts with ammonium chloride at about 250° to 500° C. in the presence of a hydrochlorination type catalyst at atmospheric pressure to form vinyl chloride. The reaction is preferably conducted at about 250° to 350° C. An excess of acetylene is used, proportions of acetylene to ammonium chloride ranging from 2:1 to 5:1. Mercury is an effective catalyst, as are chlorides of lead, bismuth, barium, magnesium, vanadium, aluminum, zinc, and iron.

The desired reaction of ammonium chloride with organic substances to produce organic chlorides occurs at high temperatures, in the range of 250° to 500° C. At this reaction temperature it is necessary for effective conversion that the ammonium chloride and organic reactant be in the vapor state. The vaporization of ammonium chloride, however, presents many difficult problems. An extraordinarily large heat input is required to vaporize ammonium chloride. About 39.6 kilocalories is required to vaporize one gram mole of ammonium chloride at 350° C. This required heat input includes not only the heat of vaporization but also the heat of dissociation of the acid and base components of the ammonium chloride. Moreover, the problem of vaporization is aggravated by the requirement that the heat must be supplied at a high level to obtain the desired reaction temperature in view of the tendency of ammonium chloride to sinter upon heating, its corrosiveness, and its poor heat transfer and sublimation characteristics. When solid ammonium chloride is contacted with a hot heat transfer surface, the small portion of the ammonium chloride in contact with the hot surface sublimes and cakes the solid ammonium chloride in a shape that has minimum contact with the heat transfer surface. The vaporized ammonium chloride forms a film which effectively insulates the bulk of solid ammonium chloride from the heat transfer surface thereby preventing effective vaporization of the remaining solid. Severe corrosion problems are encountered when ammonium chloride is vaporized in an external heater and then introduced into a reactor as the vaporized ammonium chloride is highly corrosive. Moreover, when vapors of the organic reactant are contacted with solid ammonium chloride in a manner promoting reaction, the ammonium chloride crystals stick together to form lumps and the entire bed sinters resulting in poor conversion.

We have found that ammonium chloride and the catalyst can be suspended as solids in an inert heat-stable high-boiling organic liquid to form a slurry of intimately admixed solids and that when the slurry is heated to a temperature of about 250° to 500° C., the organic liquid provides an effective reaction medium for reacting the ammonium chloride with the organic reactant. Moreover, we have found that the organic liquid provides a particularly advantageous medium for vaporization of the ammonium chloride.

According to one aspect of our invention, the organic liquid provides a reaction medium in addition to acting as a heat transfer medium. In this aspect of our invention, suitable proportions of solid ammonium chloride and finely divided solid catalyst are introduced into the organic liquid to form a slurry. The slurry is heated in a heating zone to a temperature of about 250° to 500° C. by external means. The organic reactant, in vapor or liquid form, is introduced into the heated slurry and reaction occurs in the liquid or entrained vapor. The mixture is then passed to a separating zone for removal of the vaporized reaction products. These vapors pass to a recovery system usually comprising cooling, condensing and distillation in order to fractionate the reaction products and provide for ammonia recovery.

According to another aspect of our invention, the organic liquid serves as a medium for the vaporization of the ammonium chloride. In this aspect of our invention the ammonium chloride is suspended in the organic liquid to form a slurry. The slurry is then heated to a temperature of 250° to 500° C. by external means so as to vaporize the ammonium chloride. The organic reactant, as vapor or liquid, may be introduced to assist in the vaporization of the ammonium chloride. The vaporized ammonium chloride separated from the organic liquid heat transfer medium in admixture with the appropriate amounts of the vaporized organic reactant is reacted in a separate reaction zone charged with a suitable catalyst. It is desirable to assist the removal of the ammonium chloride from the organic liquid heat transfer medium by agitation and an inert gas may be passed through the slurry. Suitable inert gases include carbon dioxide, steam, and nitrogen. It is preferable, however, to utilize the vapors of the organic reactant to sweep out the vaporized ammonium chloride as separation problems are avoided.

Our invention effectively avoids the problem of caking and the insulating effect that occurs when ammonium chloride is heated in bulk and also avoids the problem of lumping and sintering that occurs when ammonium chloride is heated by a stream of hot vapors. The use of an organic liquid heat transfer medium provides effective contact between the ammonium chloride and the heating medium thereby avoiding substantially all losses in heat transfer.

Moreover, when the organic liquid is used as a reaction medium the problem of corrosiveness is minimized as there is a minimum of unreacted ammonium chloride in the corrosive vapor state. In addition to the advantage of using the organic liquid as a convenient reaction medium the heat of reaction helps to maintain the slurry at the desired temperature thereby resulting in a considerable heat saving.

The organic liquid heat transfer agent suitable for the operation of our invention must be stable at the temperatures effecting the vaporization of ammonium chloride and its reaction with organic substances, that is 250° to 500° C., and also non-reactive with the catalyst, ammonium chloride, organic reactants and organic chlorides at these temperatures. For example, we have found that chlorinated diphenyls are useful, particularly the products known as "Aroclor 1254" and "Aroclor 1248." Other heat transfer agents found suitable include diphenyl, diphenyl oxide, mixtures of diphenyl and diphenyl oxides, ditolylethane, terphenyl, tetraphenyl silicon, polychlorobenzenes and highly aromatic petroleum oils.

The process of our invention may be operated batchwise or continuously. In the batchwise process of operating our invention when the organic liquid is used only as a medium for vaporizing ammonium chloride, a suitable vessel is charged with the desired amount of organic liquid heat transfer agent and internal or external heating means are provided. Ammonium chloride is charged to the heating vessel along with the organic liquid heat transfer agent. The resulting slurry is then heated and the vaporized ammonium chloride is removed until the charge is exhausted and passed to a reaction zone where it is contacted with vapors of the organic reactant in the presence of catalyst. When the organic liquid heat transfer agent is used as a reaction medium, as much ammonium chloride and catalyst as can be conveniently kept in suspension is added to the original charge of organic liquid heat transfer agent to form a slurry and the organic reactant is introduced as vapor or liquid until the proportion of ammonium chloride is too low to maintain a satisfactory degree of conversion. Several such batch operations may be operated in parallel and provide a continuous flow of product. One batch may be reacting while another reactor is being charged and a third reactor is being cleaned. Separation of the product again may be batchwise or continuous. Such batch operation is advantageous when a low capital investment in equipment is desired.

The operation may be made continuous by the addition, continuously or intermittently, of fresh catalyst and ammonium chloride to the slurry and continuously removing a portion of the batch of heat transfer agent from the heating chamber, filtering and returning to the heating chamber. More conveniently, when the organic liquid is used as a reaction medium, the slurry of ammonium chloride, catalyst and organic liquid is continuously circulated in a closed cycle. Suitable proportions of catalyst are introduced separately or in admixture with the ammonium chloride to form a slurry which is pumped through a heating zone. The organic reactant is injected continuously as vapor or liquid into the slurry at any suitable point in the system. The reaction occurs in the liquid or entrained vapor. Following the introduction of the organic reactant, a suitably long transfer line is provided for adequate reaction time and the slurry then passes through a separating zone where the vaporized reaction products are separated from the slurry. Usually some spray or vapor of the heat transfer agent is carried by the stream of gaseous products and a separator is desirable for removing these higher boiling materials from the exit gases. Suitably, the separated liquid is returned to the circulating slurry. The separated vapors, if completely reacted, pass directly to a recovery system for the products. If the reaction is incomplete, however, it is advantageous to pass the partially reacted mixture to a subsequent separate reaction zone to provide adequate time of reaction or to elevate the temperature of the reactants to complete the reaction. This second reaction zone also gives better control of reactant proportions. This second reaction zone contains catalyst in the form of a fluidized bed, a fixed bed or a moving compact bed in pill form. The organic chloride is separated from the gaseous products in a fractionating column, unreacted materials and by-products being returned to the slurry while the organic chloride is recovered as the product. This continuous method of operation is advantageous when large quantities of organic chlorides are desired to be produced in the most economical manner.

In the operation of our invention where the organic liquid is used as a reaction medium, the catalyst, preferably alumina, should be finely divided and should be finer than about 80 mesh for best results. A sample through 80 and retained on 200 mesh is satisfactory although an alumina finer than 200 mesh gives a high production rate. The alumina may be used without activation but somewhat better results are obtained if it is activated, for example, by heating at about 200° C. for 15 hours. The percentage of alumina in the slurry should be sufficient as to allow good mechanical agitation and fluid flow. Slurries containing as little as about 1 per cent and as much as 30 per cent of alumina in "Aroclor 1254" are satisfactory. Slurries containing about 15 per cent of alumina and 7 per cent of ammonium chloride, a total solids content of about 22 per cent, can be circulated, for example, by a centrifugal pump. High percentages of ammonium chloride and alumina in the slurry favor high conversion and high production rates. Advantageously, a portion of the slurry, after separation of the volatile products, may be continuously removed, filtered admixed with fresh alumina and returned to the system.

The rate of introduction of organic reactant for a desired conversion or production rate depends on the composition of the slurry, temperature, agitation, equipment design and the method of contacting the vapors with the ammonium chloride and catalyst. As the feed rate of the organic reactant increases in proportion to the ammonium chloride in the slurry, the production rate of organic chloride increases but the conversion of the organic reactant tends to decrease. Up to certain limits, increasing the solids content of the slurries increases conversion and production rate.

The process is ordinarily operated at atmospheric pressure but may be operated at reduced or elevated pressure. However, it is particularly advantageous to operate under such conditions that the organic reactant and reaction products are vaporized at the reaction temperature. To some extent, the capacity of any particular equipment may be increased by the use of elevated pressures. The use of pressures sufficiently low to cause sublimation of ammonium chloride, particularly below the preferred reaction temperatures, is undesirable in our process.

The products of our process may be accumulated and purified by batch methods. Continuous separation and purification of the products and return of by-product ether, amines and unreacted organic materials to the system is preferred. It is advisable to modify the details of the recovery procedure in each instance according to the physical properties of the organic reactant charged and the properties and concentration of the products. For example, when ethanol is the organic reactant, fractional distillation is probably the most economical method for recovery of ethyl chloride whereas a multi-stage extraction procedure may be more economical in the recovery of methyl chloride. In the case of methyl chloride, the reaction mixture usually comprises a mixture of methyl chloride, ammonia, small amounts of lower amines and ether, water vapor and unreacted ammonium chloride. Water scrubbing will remove in solution the ammonia, ammonium chloride, the amines and a small amount of ether. This mixture may be worked up by distillation. The unabsorbed vapors comprising methyl chloride contaminated with small amounts of ether and saturated with water vapor advantageously are contacted in a second scrubbing tower with strong sulfuric acid. The ether and water vapor are absorbed by the sulfuric acid and the dried methyl chloride is recovered by condensation. The ether may be separated from the sulfuric acid by heating for disposal as by-products or for recycle. The sulfuric acid is reconcentrated occasionally as necessary.

The process of our invention is particularly applicable to the reaction of ammonium chloride with lower aliphatic alcohols. For example, our process has special advantages in the preparation of methyl chloride and ethyl chloride from ammonium chloride and methanol and ethanol respectively. Other aliphatic alcohols which may be used as organic reactants in our process are isopropanol, isoamyl alcohol, lauryl alcohol and other higher aliphatic alcohols. Cycloaliphatic alcohols, for example cyclohexanol, and aromatic substituted alcohols such as benzhydrol may also be used.

The operation of our invention will be further illustrated by reference to the accompanying drawings of which Figure 1 is a schematic flow plan illustrating a method of vapor phase operation using an organic liquid heat transfer agent as a medium for the vaporization of ammonium chloride and Figure 2 is a schematic flow plan of slurry operation using the organic liquid as a reaction medium. In the operation of Figure 1, an organic liquid heat transfer agent, for example "Aroclor 1254," is introduced as necessary through line 10 to tank 11 and circulated by means of pump 12 through line 13 past ammonium chloride feeder 14. Ammonium chloride is introduced to the system at feeder 14 and the resulting slurry is passed through line 15 to heater 16. The organic reactant charge, for example alcohol, is pumped from storage tank 17 by means of pump 18 through line 19 and may by vaporized either by introducing liquid organic reactant into the slurry in line 15 by injection from line 20 before heater 16 or by means of line 21 into heater effluent removed from heater 16. The mixture in line 22 is discharged into separator 23 and mixture of organic reactant and ammonium chloride vapors is withdrawn overhead through line 24 and charged to the foot of the reactor 25. The organic liquid heat transfer medium with unvaporized ammonium chloride is passed from the lower portion of separator 23 through line 26 back to tank 11 for recirculation. The reactor 25 contains a bed of catalyst, for example alumina, in particle form through which the mixture of vapors is passed. Reaction vapors are taken overhead from reactor 25 through line 27 and passed into the lower portion of scrubber 28. Water is introduced to the top of scrubber 28 through line 29 in order to remove ammonia, ammonium chloride carryover and water-soluble materials, such as lower amines and some lower ethers in case of lower alcohol charging materials. The water solution is removed from the bottom of scrubber 28 through line 30 and is separately processed by distillation to recover ammonia and to fractionate the remaining water-soluble materials for by-products or recycle.

The unabsorbed vapor stream from scrubber 28 passes through line 31 to fractionator 32 in which separation of the organic chloride is effected. A part of the liquid product passes through line 33 to cooler 34 and is pumped by means of pump 35 as reflux to the top of fractionator 32 through line 36 while the excess is returned through line 37 to storage tank 17 for recycling. The organic chloride product is taken overhead through line 38.

In the operation of Figure 2 the organic liquid is used as a reaction medium in addition to a heat transfer medium and continuously circulated. A slurry is made up in tank 110 by the addition of catalyst, for example alumina, through line 111 and ammonium chloride through line 112. The organic liquid heat transfer agent introduced to the slurry tank 110 comes in part from storage tank 113 and filter 114 via line 115 and from heater 116 via line 117. Cooling (not shown) may be provided in one of these lines to adjust the temperature of the slurry, which should be sufficient to vaporize any moisture added with the ammonium chloride or catalyst but insufficient to vaporize the ammonium chloride. Moisture is vented through line 112A. The slurry is removed via line 118 to pump 119 and transferred via line 120 to the inlet of heater 116.

The hot slurry is transferred from heater 116 via line 121 to separator 122. Organic reactant, for example alcohol, from storage tank 123 is injected into this line near the furnace via line 124, pump 125 and line 126. Reaction is very rapid and occurs in the transfer line 121 between the point of injection of the organic reactant and separator 122. If desired, a vaporizer (not shown) may be inserted in line 126 in order to inject organic reactant vapor rather than liquid into the hot slurry.

In the separator 122 a slurry is removed from the bottom by pump 127 and returned to the heater 116 via line 128. A portion of the slurry is continuously removed by valved line 129 to filter 114. The filtrate is transferred to storage tank 113 and by line 115 to slurry tank 110. Catalyst removed from the filter is reactivated and returned to slurry tank 110. The vapor from separator 122 containing organic chloride, ammonia, water and unreacted organic reactant with small amounts of ammonium chloride and the heat transfer agent may be advantageously scrubbed in scrubber 129 before condensation and fractionation. It is preferred to contact these vapors with some of the heat transfer agent through line 130 at a temperature sufficiently high to condense and remove only ammonium chloride and entrained heat transfer agent. Water, alcohol, ammonia and organic chloride may be passed to water scrubber 131 for introduction to fractionator 132 where the vapors are separated and elsewhere condensed as in the operation of Figure I. The organic chloride product is removed overhead by line 133.

Our process will be further illustrated by reference to the following experimental examples.

*Example I*

A slurry of 4,347 parts by weight of chlorinated diphenyl (54% chlorine) 428 parts by weight of ammonium chloride and 280 parts by weight of alumina was maintained at a temperature of 308–319° C. while ethanol vapor was introduced at the rate of 0.188 part per minute. A total of 41.8 parts by weight of ethanol was thus introduced. The ethyl chloride separated represented a 76 per cent conversion of the alcohol charged.

*Example II*

In a comparative test of catalyst in the slurry modification, 60 gms. of the catalyst was suspended in 4 kg. of "Aroclor 1254" maintained at a temperature of about 300–325° C. and containing 4 gram mols of ammonium chloride. Ethanol vapor was introduced at relatively high rates of from about 0.009 to 0.017 gm. mol per minute to obtain high production rates. As a result the conversion of ethanol to ethyl chloride was low compared to other examples but the catalyst could be compared in activity. The following table shows the effectiveness of the catalyst as measured by the per cent of conversion:

| Catalyst: | Conversion, per cent |
|---|---|
| $Al_2O_3$ | 29 |
| Magnesol | 28 |
| Florisil | 26 |
| Florite | 22 |
| $Al_2O_3+ZnCl_2$ | 16 |
| Florex | 13 |
| CuCl | 8 |
| Fuller's earth | 8 |
| $SiO_2$ | 4.3 |
| $Fe_2O_3$ | 0.3 |
| $BaCl_2$, $CaCl_2$, $AlCl_3$ | 0 |
| BaO, MgO, CaO, ZnO | 0 |

*Example III*

A slurry of 275 parts by weight of 1,2,3,4-tetrachlorobenzene, 37 parts of ammonium chloride and 20 parts of alumina was maintained at 250° C. in an externally heated reaction chamber. Nitrogen was passed through the system to maintain the solids in suspension. Ethanol was vaporized and passed through the slurry and to a condensing system for the recovery of ethyl chloride.

*Example IV*

Pentachlorobenzene was substituted for the tetrachlorobenzene used in Example III with similar results.

*Example V*

A slurry of 214 parts of ammonium chloride and 60 parts of alumina in 2610 parts of ditolyl ethane was held at 280–290° C. for 6 hours while 218 parts of ethanol was passed through. Ethyl chloride was recovered from the condensed gaseous products by fractionation.

*Example VI*

A slurry of 60 parts of alumina and 214 parts of ammonium chloride in 2715 parts of coal tar bases (boiling range, 272–375° C.) was maintained at 308–323° C. while 91 parts of ethanol was introduced during a period of 164 minutes. About 18.8 per cent of the ethanol was converted to ethyl chloride. Conversion was 20 per cent when the procedure was repeated introducing ethanol at the rate of 0.083 part per minute.

*Example VII*

A batch of 1750 parts by weight of "Aroclor 1254" containing 94 parts of ammonium chloride and 327 parts of alumina was circulated through about 8 feet of 1" iron pipe externally heated and insulated. The slurry was thus maintained at 310–319° C. During a period of one hour, 40 parts of ethanol vapor was injected and 30 parts of ethyl chloride was separated from the reaction products.

*Example VIII*

In a cyclic system about 1200 gms. of "Aroclor 1254" was circulated at the rate of 1 gal./min. Solid ammonium chloride was introduced at the rate of 30 gms./hr. and the mixture was maintained at a temperature of 310° C. by passage through a heating section. Methanol was introduced at the rate of 30 gms./hr. and the vapor mixture was removed from the separator and passed to a catalyst chamber for the manufacture of methyl chloride.

We claim:

1. In the process of producing organic chlorides by the reaction of ammonium chloride with an organic compound reactive therewith to form an organic chloride at an elevated temperature and in the presence of a solid catalyst effective to promote the reaction, the steps of forming a slurry comprising solid ammonium chloride suspended in an inert heat-stable high-boiling organic liquid, heating the slurry to a reaction temperature sufficient to vaporize ammonium chloride and reacting the ammonium chloride dissociation products with the reactive organic compound in the presence of the catalyst at a temperature of about 250° to 500° C.

2. The process of claim 1 in which the reactive organic compound is a lower aliphatic alcohol.

3. In the process of producing organic chlorides by the reaction of ammonium chloride with an organic compound reactive therewith to form an organic chloride at an elevated temperature and in the presence of a solid catalyst effective to promote the reaction, the steps of forming a slurry comprising solid ammonium chloride and finely divided solid catalyst suspended in an inert heat-stable high-boiling organic liquid, heating the slurry to a temperature of about 250° to 500° C., and introducing the reactive organic compound into the hot slurry to effect reaction of the ammonium chloride and reactive organic compound.

4. The process of claim 3 in which the reactive organic compound is a lower aliphatic alcohol.

5. In the process of producing organic chlorides by the reaction of ammonium chloride with an organic compound reactive therewith to form an organic chloride at an elevated temperature and in the presence of a solid catalyst effective to promote the reaction, a continuous process of reacting the ammonium chloride which comprises forming a slurry comprising solid ammonium chloride and finely divided catalyst suspended in an inert heat-stable high-boiling organic liquid in a mixing zone, circulating the slurry to a heating zone, introducing the reactive organic compound to the hot slurry and reacting the mixture in a reaction zone at a temperature of about 250° to 500° C., removing the reaction products from the reaction zone and returning the organic liquid and catalyst to the mixing zone.

6. The process of claim 5 in which the reactive organic compound is a lower aliphatic alcohol.

7. The process which comprises forming a slurry comprising solid ammonium chloride suspended in an inert heat-stable, high-boiling organic liquid, heating the slurry to a reaction temperature sufficient to vaporize ammonium chloride and reacting the ammonium chloride dissociation products with a lower aliphatic alcohol in the presence of a dehydrochlorination type catalyst at a temperature of about 250° to 500° C.

8. A process according to claim 7 in which the catalyst is alumina.

9. A process according to claim 7 in which the alcohol is methanol.

10. A process according to claim 7 in which the alcohol is ethanol.

11. The process which comprises forming a slurry comprising solid ammonium chloride and finely divided alumina in an inert heat-stable, high-boiling organic liquid in a mixing zone, circulating the slurry to a heating zone, introducing a lower aliphatic alcohol to the hot slurry and reacting the mixture in a reaction zone at a temperature of about 250° to 500° C., removing the reaction products from the reaction zone and returning the organic liquid and alumina to the mixing zone.

12. A process according to claim 11 in which the alcohol is methanol.

13. A process according to claim 11 in which the alcohol is ethanol.

References Cited in the file of this patent

UNITED STATES PATENTS

| 1,812,542 | Nieuwland | June 30, 1931 |
| 2,328,430 | Dornte | Aug. 31, 1943 |

FOREIGN PATENTS

| 452,934 | Great Britain | Sept. 2, 1936 |

(Other references on following page)

FOREIGN PATENTS

| | | |
|---|---|---|
| 686,849 | Germany | Jan. 17, 1940 |
| 704,759 | Germany | Apr. 7, 1941 |

OTHER REFERENCES

Mellor: "Comprehensive Treatise on Inorganic and Theoretical Chemistry," vol. II, pp. 566–9, 573–4 (1922).

Rodebush et al.: "Jour. Am. Chem. Soc.," vol. 51, pp. 748–59 (1929).

Pray et al.: "Jour. Am. Chem. Soc.," vol. 70, pp. 433–4 (1948).

Stephenson: "Jour. Chem. Phys.," vol. 12, pp. 318–9 (1944).

"Chem. Abstracts," vol. 28, p. 7539 (1934). Abstract of article by Porai-Koshitz.